United States Patent

Hulme

[15] 3,695,094
[45] Oct. 3, 1972

[54] LEAK DETECTION METHOD AND SYSTEM

[72] Inventor: Jack R. Hulme, Duncan, Okla.

[73] Assignee: Halliburton Company, Duncan, Okla.

[22] Filed: July 16, 1970

[21] Appl. No.: 55,480

[52] U.S. Cl..............................73/40.5, 340/242
[51] Int. Cl.............................................G01m 3/28
[58] Field of Search............73/40, 40.5, 49.1, 194 R; 340/239, 242; 235/151.34

[56] References Cited

UNITED STATES PATENTS

| | | |
|---|---|---|
| 3,505,513 | 4/1970 | Fowler et al................73/40 X |
| 2,828,479 | 3/1958 | Jackson, Jr.................340/239 |
| 3,566,685 | 3/1971 | Zimmerman et al. 235/151.34 X |

Primary Examiner—Louis R. Prince
Assistant Examiner—William A. Henry, II
Attorney—Burns, Doane, Swecker & Mathis

[57] ABSTRACT

Method and apparatus for determining when the volume of fluid leakage in a conduit exceeds a predetermined percentage of the volume of total fluid flow by measuring the volume of fluid leakage from the conduit, comparing the volume of fluid leakage with a predetermined percentage of the volume of total fluid flow and generating a distinctive signal based on the comparison.

13 Claims, 2 Drawing Figures

INVENTOR
JACK R. HULME

BY
Burns, Doane, Benedict, Swecker & Mathis
ATTORNEYS 3,695,094

LEAK DETECTION METHOD AND SYSTEM

BACKGROUND OF THE INVENTION

The present invention relates to a leak detector and more specifically to a circuit for determining when the volume of fluid leakage from a pipeline exceeds a predetermined percentage of the volume of total fluid flow.

The system of the present invention has particular utility in the detection of oil leakage from a suboceanic pipeline connecting a pumping station at an offshore well to an onshore receiving station where pollution of the water may be a primary concern.

The prior art is replete with circuits which attempt to measure leakage and to compare the volume of fluid leakage with an absolute reference. Once the reference is exceeded a suitable warning alarm signal is customarily given. Another technique of the prior art is the mounting of a pressure switch means in the conduit which, when the fluid pressure drops below a predetermined level, operates to energize a suitable warning alarm.

While both of these and other systems heretofore generally utilized are satisfactory under certain conditions, other conditions such as a large variation in the volume of flow render these types of systems unsatisfactory. For instance when a small volume of fluid is flowing through the conduit, the absolute volume of leakage reference will be set to a relatively small value. However, when the volume of fluid flow is increased, the same reference may represent a minute and perfectly acceptable percentage of fluid leakage so that the warning is of little value.

In another instance when the fluid pressure is relatively high, the absolute leakage reference will be set to a relatively high value. But should the fluid pressure fluctuate or be reduced, the volume of leakage could remain unchanged and thus constitute a very large percentage of fluid flow without generating an alarm.

It is accordingly an object of the present invention to obviate the deficiencies in the prior art and provide a novel system and method for modifying the acceptable fluid leakage reference as a function of a parameter of the system such as total fluid flow.

It is another object of the present invention to provide a novel method and system for comparing the volume of fluid leakage with a predetermined percentage of the volume of the total fluid flow to control the generation of a warning signal.

Other applications, objects and advantages will, however, be readily apparent to one skilled in the art to which the invention pertains, from the claims and from the following detailed description when read in conjunction with the appended drawings.

THE DRAWINGS

FIG. 1 is a functional block diagram of one embodiment of the system of the present invention; and FIG. 2 is a graph of fluid leakage versus fluid flow in which the operation of the present system is compared with the known prior art systems.

DESCRIPTION OF THE PREFERRED EMBODIMENT

Figure 1:
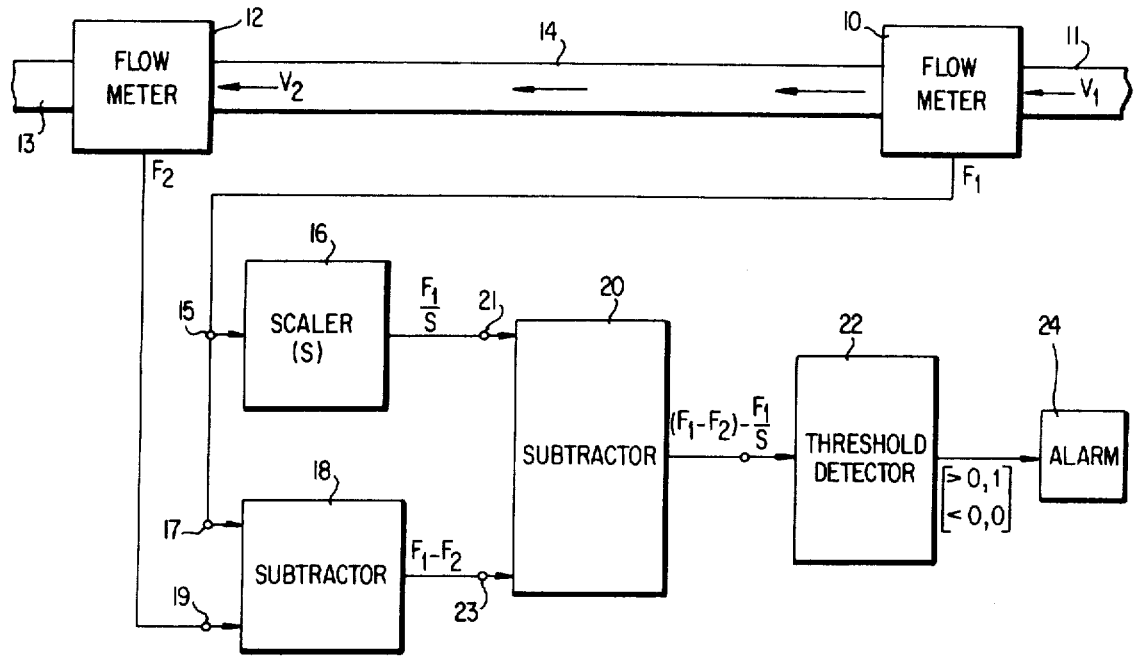

With reference now to the drawings, and more particularly to FIG. 1, a flowmeter 10 is connected to one end 11 of a pipeline 14 and a flowmeter 12 is connected to the other end 13 of the pipeline 14. Both of the flowmeters 10 and 12 may be conventional in construction and operation and operate to provide a series of electrical pulses related in pulse repetition rate to the rate of fluid flow through the meter.

The output signal $F_1$ from the flowmeter 10 is applied to an input terminal 15 of a scaler 16 and to an input terminal 17 of a subtractor 18. The output signal $F_2$ from the flowmeter 12 is applied to a second input terminal 19 of the subtractor 18. The scaler 16 may be any suitable conventional circuit for providing one output pulse upon the application of a predetermined number of input pulses. The subtractor 18 may likewise by any suitable and conventional circuit for producing an output signal the frequency of which is related to the difference in the pulse repetition rates of the applied input signals.

The output signals from the scaler 16 and the subtractor 18 are applied, respectively, to the input terminals 21 and 23 of a similar subtractor 20 and the output signal from the subtractor 20 is applied to threshold device 22. The output signal from the threshold device 22 is applied to a suitable conventional alarm 24.

In operation and with continued reference to FIG. 1, the volume $V_1$ of fluid entering the pipeline 14 at the upstream end 11 is measured by the flowmeter 10. The volume $V_2$ of fluid exiting the pipeline 14 at the downstream end 13 thereof is measured by the flowmeter 12. The output signal from flowmeters 10 and 12 is a series of electrical pulses $F_1$ and $F_2$, respectively, and the number of electrical pulses in the signal $F_2$ is subtracted from the number of electrical pulses in the signal $F_1$ in the subtractor 18. The output signal of the subtractor 20 is thus representative of fluid leakage.

The number of electrical pulses in the signal $F_1$ is reduced by a scaling factor S in the scaler 16. The scaling factor S may be selected to reflect a meter correction factor as well as a leakage factor which are discussed later.

The subtractor 20 subtracts the scaled signal $(F_1/S)$ from the fluid leakage volume $(F_1-F_2)$ and this signal $(F_1-F_2) - (F_1/S)$ is applied to the threshold detector 22 for comparison with a selected reference.

The leakage factor S, when divided into the volume of total fluid flow, yields the maximum acceptable volume of fluid leakage for that volume of total fluid flow. The leakage factor S can be determined by setting the transfer function of the system equal to zero since the threshold detector is selected to generate an output signal only when $(F_1-F_2) - (F_1/s)$ is greater than zero. The leakage factor S may then be selected by the formula:

$$S = F_1/F_1 - F_2 \qquad (1)$$

The scaling factor $S$ may in addition be modified to reflect a meter correction factor designed to correct any error in the system introduced by differences in the characteristics of the two flowmeters 10 and 12 at equal volumes of fluid flow.

By utilizing a plurality of threshold detectors, each detector being set at a different predetermined level, warnings may be given for various ratios of leakage to fluid flow.

The threshold detector may be of any conventional type and may include, for example, an integrating capacitor having a predetermined leakage resistor connected thereacross to convert the pulses to an analog signal for comparison with a reference signal in a conventional differential amplifier.

Figure 2:
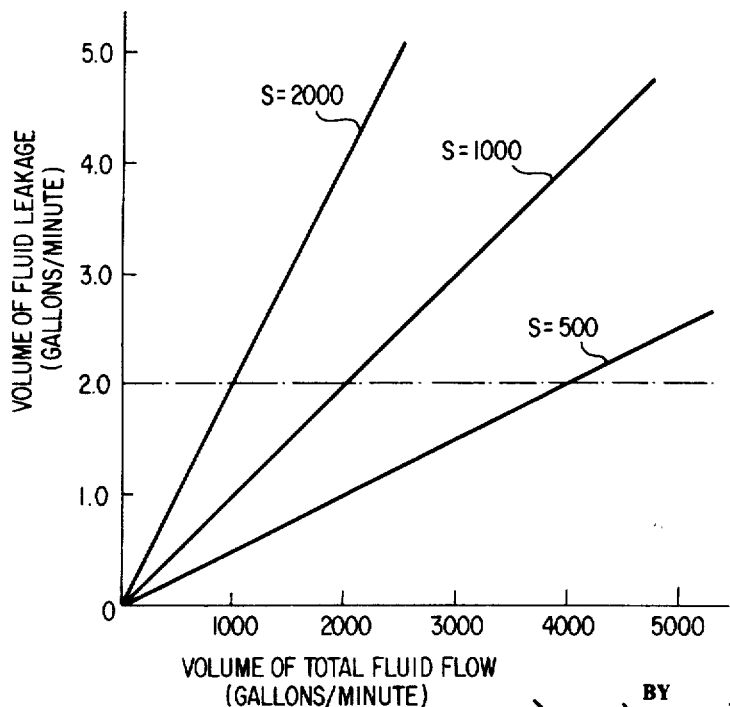

FIG. 2 is a graph illustrating the manner in which the present system differs from prior art systems. With the prior art systems utilizing an absolute leakage reference, acceptable leakage value is a constant illustrated at a rate of 2.0 gal/min. The reference of the present invention is variable and related to the total volume of fluid flow. The slope of the curve is determined by the scaling factor $S$. The curves for $S = 500$, 1,000 and 2,000 are illustrated by way of example.

Although the invention has been described in considerable detail with reference to a preferred embodiment, it will be understood that variations and modifications can be effected without departing from the spirit and scope of the invention and the invention is, therefore, to be limited to the language of the appended claims when accorded a full range of equivalents.

What is claimed is:

1. Apparatus comprising:
   first flowmeter means for generating a first signal related to fluid flow at a first point in a conduit;
   second flowmeter means for generating a second signal related to fluid flow at a second point in said conduit:
   first comparing means for generating a first output signal related to the difference between said first signal and said second signal;
   second comparing means for generating a second output signal related to the difference between said first output signal and one of said first signal and said second signal.

2. The apparatus of claim 1 wherein:
   said first flowmeter means is upstream of said second flowmeter means; and
   said one of said signals is said first signal.

3. The apparatus of claim 1 including a scaler having a scaling factor related to the ratio of the maximum permissible volume of fluid leakage to the total volume of fluid flow.

4. The apparatus of claim 3 wherein said scaling factor is also related to the ratio of said first signal to said second signal at the same volume of fluid flow through said first and second flowmeter means.

5. The apparatus of claim 1 wherein:
   said first flowmeter is upstream of said second flowmeter;
   said one of said signals is said first signal; and
   said apparatus further includes a threshold detecting means for generating a third output signal when said second signal reaches a predetermined level.

6. The apparatus of claim 5 including a scaler having a scaling factor related to the maximum permissible ratio of the volume of fluid leakage to the total volume of fluid flow.

7. The apparatus of claim 6 wherein:
   said first signal is a series of electrical pulses having a pulse repetition rate related to the rate of fluid flow at said first point;
   said second signal is a series of electrical pulses having a pulse repetition rate related to the rate of fluid flow at said second point;
   said first output signal is a series of electrical pulses related in number to the difference between the number of pulses in said first and second signals;
   said scaling means generates an output signal comprising a series of electrical pulses related in number to the number of electrical pulses in said first signal;
   said second output signal is a series of electrical pulses related in number to the difference between the number of pulses in said first output signal and said scaling means output signal; and
   said threshold means generates a distinctive output signal when the number of pulses in said first output signal is greater than the number of pulses in said scaling means output signal.

8. Apparatus for comparing fluid leakage to fluid flow in a conduit comprising:
   means for generating a first electrical signal related to the volume of fluid flow at a first point in said conduit;
   means for generating a second electrical signal related to the volume of fluid leakage. between the first and a second point in said conduit;
   means for comparing said first and second electrical signals.

9. A method comprising the steps of:
   a. generating a first electrical signal related to the rate of fluid flow at a first point in said conduit;
   b. generating a second electrical signal related to the rate of fluid flow at a second point in said conduit;
   c. generating a third electrical signal related to the difference between the first and second signals;
   d. generating a fourth electrical signal related to the difference between said third electrical signal and one of said first and second electrical signals.

10. The method of claim 9 including:
    generating a fifth electrical signal when said fourth electrical signal exceeds a predetermined reference level.

11. A method of evaluating fluid leakage comprising the steps of:
    a. generating a first signal variable responsively to fluid leakage;
    b. generating a second signal variable responsively to a parameter of the fluid; and
    c. comparing the first variable signal and the second variable signal to evaluate fluid leakage.

12. The method of claim 11 wherein the first and second signals are digital electrical signals; and,
    wherein the parameter of the fluid to which the second signal is related is the volume of fluid flow at a predetermined point.

13. The method of claim 12 wherein the first signal is generated by measuring the volume of fluid flow at two spaced points; and,
    wherein said predetermined point is the upstream one of the two spaced points.

* * * * *